United States Patent [15] 3,681,914
Loewengart [45] Aug. 8, 1972

[54] DIGITAL MASTER CLOCK

[72] Inventor: Harry R. Loewengart, New York, N.Y.

[73] Assignee: Quasar Microsystems, Inc., Brentwood, N.Y.

[22] Filed: April 30, 1970

[21] Appl. No.: 33,276

[52] U.S. Cl. ......................58/24, 58/35, 340/147 SY, 343/7.5

[51] Int. Cl. ............................G04c 13/00, G04c 9/00

[58] Field of Search ..............................58/24–26, 35; 343/7.5, 225; 340/147 SY, 309.1; 178/69.5

[56] References Cited

UNITED STATES PATENTS

| | | | |
|---|---|---|---|
| 3,128,465 | 4/1964 | Brilliant | 343/7.5 |
| 3,541,552 | 11/1970 | Carlson | 343/225 |

*Primary Examiner*—Richard B. Wilkinson
*Assistant Examiner*—E. Simmons Jackmon
*Attorney*—Sandoe, Hopgood and Calimafde

[57] ABSTRACT

A master clock source develops clock signals for transmission to a plurality of receiving or "slave" terminals. The clock signals are periodically scanned and transferred to the slave terminals once each second, thereby to continuously up-date the clock indication at the receiving terminals.

12 Claims, 3 Drawing Figures

Figures 1, 2B:
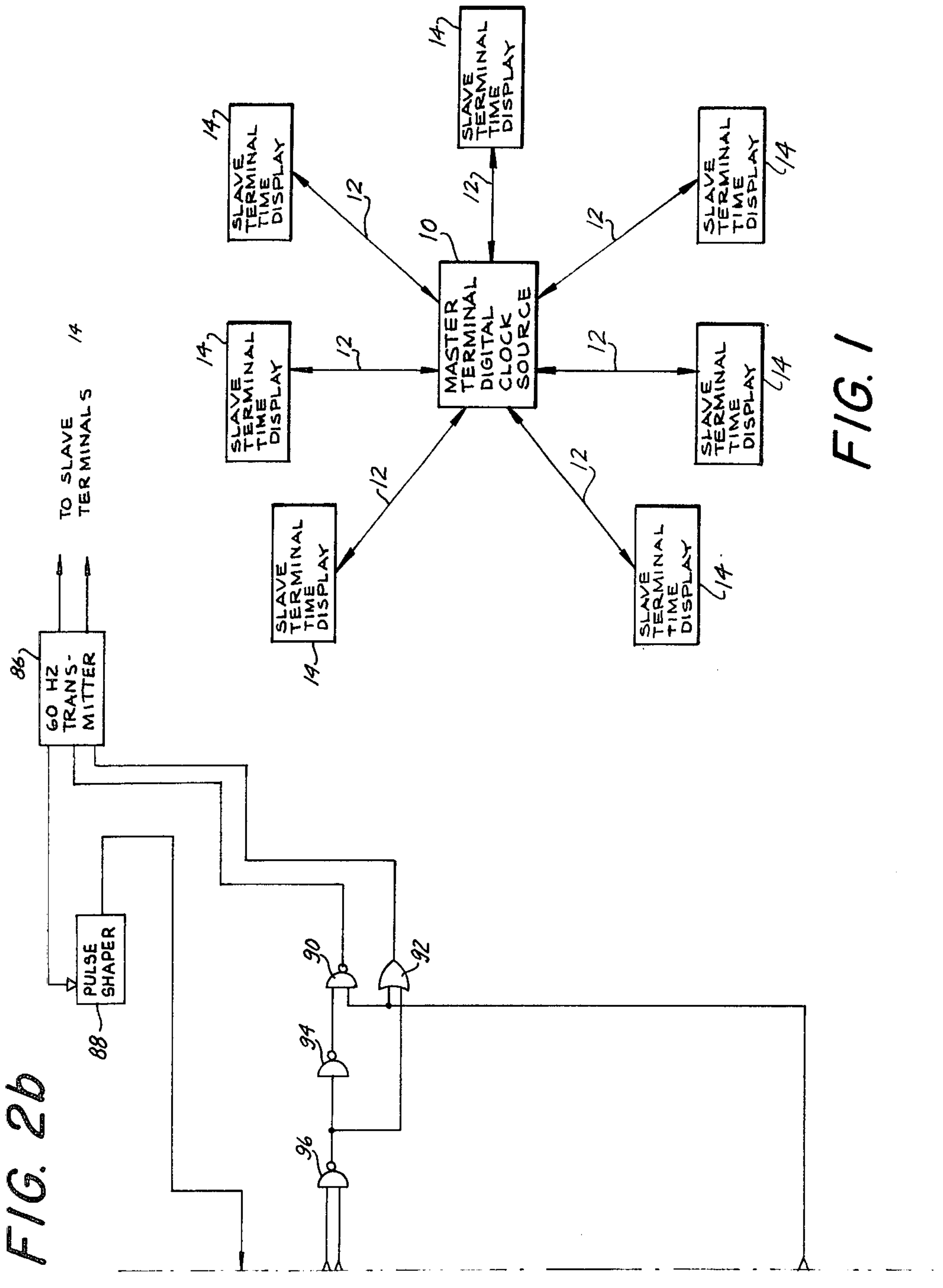

INVENTOR
HARRY R. LOEWENGART
BY
Sandoe, Hopgood & Calimafde
ATTORNEYS

INVENTOR
HARRY R. LOEWENGART
BY
Sandoe, Hopgood & Calimafde
ATTORNEYS

DIGITAL MASTER CLOCK

The present invention relates generally to clock signal sources, and more particularly to a clock signal source for use in a multi-terminal computer system in which clock signals are produced at a master terminal and transmitted to indicators at one or more remote or slave terminals.

In many applications such as digital computer systems, it is essential that a precise indication of time be available, such as when a direct correlation must be obtained between the occurrence and the time of occurrence of an event.

In these systems the event is recorded at one of a series of computer terminals commonly referred to as "-slave" terminals which are all coupled to a central or master computer terminal, at which the information of the event is processed and stored for future use. A typical example of a system of this type would be an attendance recorder in which an employee, upon reporting for work, for example, places a coded time card into a scanning device at one of the slave terminals. The employee identification data is transmitted from that slave terminal to the master terminal in which a recordation of the event is made and stored for future use, such as in the preparation of payroll records. For the information to be significant, it would include an indication of the time at which the employee inserted his card.

It is usually desirable in these systems to provide a separate clock indication at each of the remote terminals, and, frequently, a time indication is printed on the employee's card upon its insertion in the slave terminal to provide him with a record of his employment periods. For the records prepared at the slave and master terminals to be in precise agreement, there must be a precise correlation between the clock indications at all the slave terminals and the clock signals utilized in the master computer for data processing purposes.

For this reason, as well as for reasons of economy, the clock indicators at the slave terminals are all operatively connected to the master terminal and receive their clock signals therefrom. That is, the slave terminals require only a time indicator rather than a source of clock signals. Clock signals are generated in a known manner by establishing basic counting signals at the smallest desired time interval, e.g., seconds, and then dividing those signals into clock signals representing tens of seconds, minutes, tens of minutes, hours and tens of hours. In conventional multi-terminal digital systems of the type described, the remote time indications are provided only to the nearest minute. In those systems, the remote terminal time indication is updated each minute upon the corresponding change in the time indication at the master terminal.

One problem that is often experienced in these systems is the improper time indication, or the complete absence of a time indication, at one or more of the remote terminals as a result of, for example, a temporary power failure at the slave terminal, or a temporary failure in the transmission link between the master terminal and the slave terminals. When this occurs the time indications at the slave terminals no longer accurately correspond to the time signals produced at the master terminal as is necessary for the proper functioning of the system.

In other applications, it may be desirable or essential that all the slave terminals read exactly the same time at all times. Thus, in airport control towers having slave clocks spaced around the tower, one master clock would be used to control all the slave clocks to read the same time. It is, therefore, the principal object of this invention to provide in a master-slave clock system, means for continuously maintaining current time indications at all the slave terminals.

It is another object of this invention to provide in a multi-terminal computer system of the type described, an improved means for continuously maintaining accurate time indicators at all of the remote terminals.

It is another object of the present invention to provide in a system of the type described means for achieving precise correspondence between the time information displayed at the remote terminals and the time signals produced at the clock source in the master terminal.

It is a further object of the present invention to provide in a system of the type described, means for periodically up-dating the time display at the remote terminals at a rate significantly higher than that of the smallest time division displayed at those terminals.

To these ends, the present invention provides a digital clock source in which clock signals representing second, minute and hour time divisions are produced. A binary word representative of a time indication is scanned and transmitted to one or more remote slave terminals at a rate higher than the smallest time division of the displayed time. Thus, for example, as in the embodiment of the invention herein specifically described, the lowest division displayed at the slave terminal is in minutes,and a complete time word is transmitted to the slave terminals once each second.

In the digital clock source herein described, the time signals are in the form of multi-bit parallel words which are applied to the inputs of a switching device. Control signals derived from a counter cause the switching device to sequentially transfer each bit of the multi-bit word in serial form to an output data transmitter at a rate determined by the frequency of the input signals applied to the counter.

The counting signals may be conveniently obtained from the available 60-Hz-power source, and the time in units of minutes and hours can be readily represented by a 16-bit word. Means may thus be provided as herein described for enabling the counter each sampling period, e.g., 1 second, for a period long enough to sample and transfer those 16 bits, e.g., sixteen-sixtieths of a second. In this manner, a complete, e.g., 16-bit, serial word accurately representative of the time as produced by the master terminal clock, is scanned and transferred to all slave terminals once each second, thereby to periodically update the time displays at those terminals.

Figure 2A:
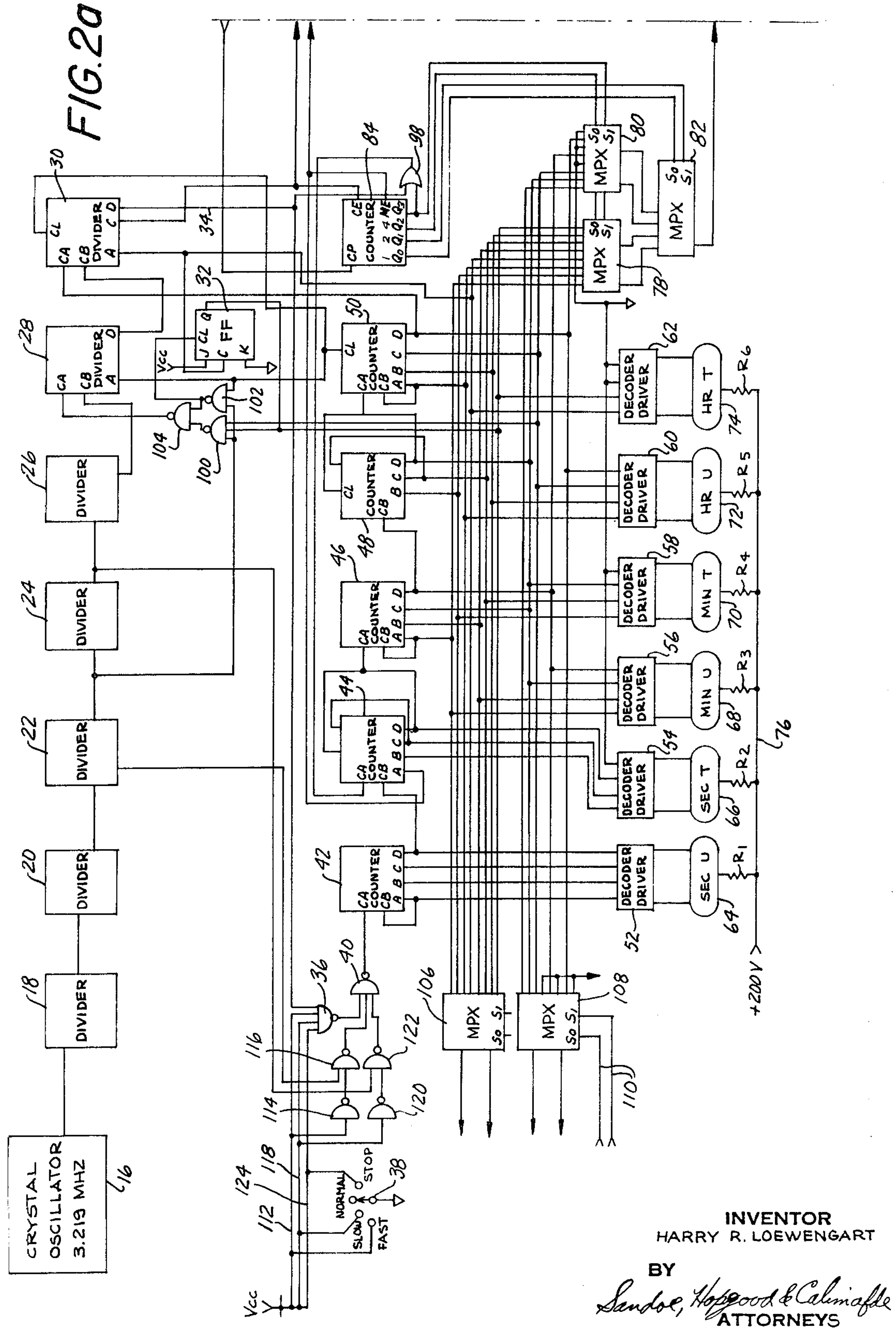

To the accomplishment of the above and to such further objects as may hereinafter appear, the present invention relates to a digital master clock substantially as defined in the appended claims and as described in the following specification taken together with the accompanying drawings in which:

FIG. 1 illustrates, in block diagram form, a typical multi-terminal digital processing system in which the digital clock source of the invention may be advantageously employed; and FIGS. 2*a* and 2*b* schematically illustrate, when horizontally combined, a digital clock source embodying the significant features of the invention.

The system illustrated schematically in FIG. 1 comprises a central processing or master computer terminal 10 connected via transmission lines 12 to a plurality of remote or slave computer terminals 14. Transactions occurring at terminals 14, such as the insertion of a coded time card, the recording of a sale, or the like, are converted into suitable signals for transmission over lines 12 to central master terminal 10 at which those signals are processed according to a predetermined program and then stored.

Each of terminals 14 has a time display such as in the form of photo-tubes or discharge tubes for providing an accurate visual read-out of the time. Those displays are actuated in response to time signals developed at central terminal 10 and transmitted over lines 12 to suitable decoder, driver and display circuitry in terminals 14. If desired, such as in an attendance recording system, the time display signals at terminals 14 may also be used in combination with a printer to cause a time print-out to be made on the employee's time card upon the insertion of that card into an appropriate scanner located thereat. Although the embodiment described herein illustrates the master-slave clock system as part of a digital data processing system, it is obvious that such a master-slave clock system can be provided independent of the computer system.

The present invention, as illustrated in greater detail in FIGS. 2*a* and 2*b*, is directed towards an improved digital clock source located in master terminal 10, which produces the binary clock signals for transmission to remote slave terminals 14. The clock source of the invention is particularly characterized in that it contains means for periodically scanning and transmitting to terminals 14 a complete time word at a rate, e.g., once each second, exceeding the smallest time division, e.g., minute,of the displayed time. As a result, the time display at terminals 14 is continuously and frequently updated to ensure a precise correspondence between the time displays at slave terminals 14 and that at master terminal 10.

The basic, e.g., 1-second, timing signals for the digital clock source of the invention are derived by dividing or counting down signals generated from a precision crystal oscillator 16. The output of oscillator 16 is connected to the input of a 4:1 binary divider or counter 18, the output of which is in turn connected to the input of a 16:1 divider 20.

The output of divider 20 is connected to the input of a 16:1 divider 22, which has an output connected to another 16:1 divider 24. The output of divider 24 is in turn connected to the input of an 8:1 divider 26, which has its output in turn connected to the $C_B$ input terminal of a first 5:1 divider 28, the latter having its D output terminal connected in turn to the $C_B$ input terminal of a second 5:1 divider 30. The A output terminal of divider 30 is connected to the clock terminal of a J-K flip-flop 32, which has its J terminal connected to a voltage supply, and its K terminal connected to ground.

The signal at the D output terminal of divider 30 at a line 34, which constitutes the basic 1-second timing signal for the clock circuit, is applied as one input of a NAND gate 36, which is enabled when a switch 38 is in its "Normal position." The one-second timing pulses are then applied to the input of a second NAND gate 40 and to the $C_A$ input of a 10:1 counter 42. The output at the D terminal of that counter, which is a 10-second signal, is connected to the $C_B$ input of a 6:1 counter 44, which thus produces at its D terminal a 1-minute signal. The latter signal is in turn applied to the $C_A$ input of a 10:1 counter 46, which produces a 10-minute signal at its D terminal, that 10-minute signal in turn being applied to the $C_B$ input of a 6:1 counter 48. The signal at terminal D of counter 46 is the 1-hour signal and is applied to the $C_A$ input terminal of a 10: 1 counter 50, which produces at its terminal D the 10-hour signal. The latter terminal is connected to the $C_A$ input terminal of divider 30, and the A output terminal of divider 30, which counts down the signal applied at its A terminal, is connected to the control terminal of flip flop 32.

The output bits of counters 42-50 as well as the output terminal Q of flip-flop 32 and output terminal A of divider 30 are respectively connected to the inputs of decoder drivers 52-62, the outputs of which are in turn connected to display devices, such as gas discharge tubes 64-74. Those tubes respectively receive their operating potential through their connection to a voltage supply line 76 through resistors R1-R6. Display tubes 64-74 thus provide a constantly changing visual display of time in terms of seconds-units, seconds-tens, minutes-units, minutes-tens, hours-units, and hours-tens respectively, corresponding to the binary signal respectively obtained from the counters 42-50, divider 30, and flip-flop 32 all in a known manner.

In accord with the present invention, the time signals produced at the outputs of counters 46-50, divider 30, and flip flop 32, which represent in binary form the minutes and hours signals, are all applied to the inputs of a switching circuit here shown as comprising multiplexers 78,80, and 82, which receive control signals from a control circuit here shown as a synchronous counter 84. The minute and hour time signals are in the form of a 16-bit parallel word, three bits of which are unconditionally tied to ground. Four bits of that word define the minutes and hours units, three bits define the minutes tens, and two bits of that word define the hours tens digits.

Those clock signals are periodically, that is, once each sampling period (e.g., 1 second), sampled and transferred in serial form by signals provided by counter 84 from multiplexers 78-82 to a data transmitter 86 (FIG. 2*b*) which transmits the clock signals in serial form to the slave terminals 14, thereby to update the time display at those terminals once each sampling period. Data transmitter 86 may be advantageously of the type disclosed and claimed in my co-pending application, Ser. No. 33,294 entitled "Data Transmission System Utilizing A.C. Line Frequency as Clock," and assigned to the assignee of the present application. No further description of data transmitter 86 will thus be given herein.

Timing signals at a predetermined rate, here shown as 60 Hz, are supplied to the input or count terminal of counter 84 from a pulse shaper 88 (FIG. 2*b*) which in turn receives a 60-Hz-A.C. signal from data transmitter 86. As will be more completely described below, counter 84 is enabled for a predetermined portion of each 1-second sampling period and produces at its output terminals $Q_0$–$Q_3$ during that portion, control signals for the multiplexers which vary at the rate of the input timing signals, that is, once each one-sixtieth of a second. Thus, to transmit a complete 16-bit word, multiplexers 78–82 are sequentially switched 16 times each second, 1 bit of the time word being transmitted to data transmitter 86 each of those switching times.

Multiplexers 78 and 80 receive at their inputs the thirteen bits representing the hours and minutes of the time, the remaining three inputs of multiplexers 80 being, as noted above, connected to ground. The control terminals $S_0$ and $S_1$ of multiplexers 78 and 80 receive control signals from the least significant output bits of counter 84, that is, the signals produced at output terminals $Q_2$ and $Q_3$ of counter 84. The output terminals of multiplexers 78 and 80 are applied as the four inputs of multiplexer 82, which receives its control binary signals from the output terminals $Q_0$ and $Q_1$ of counter 84.

The output of multiplexer 82, which is the 16-bit serial clock word, is connected to the inputs of a NAND gate 90 and to an OR gate 92 (FIG. 2*b*), the respective outputs of which are connected to the input of data transmitter 86. The other input to gate 90 is obtained from the output of an inverter 94 which in return has its input connected to the output of a NAND gate 96. The output of NAND gate 96 is also connected to the other input of OR gate 92. The inputs of NAND gate 96 are connected to the reset terminals of counter 84. NAND gate 96 is thus enabled, as will become clearer, only during the period that counter 84 is enabled and providing coded control signals to multiplexers 78–82.

Counter 84 is enabled when the signals at its $C_E$ and $M_E$ terminals are both high. The former terminal is connected to the C output terminal of divider 30, while the latter terminal is connected to the A output terminal of counter 44, which in turn is connected to the output of an OR gate 98. The inputs to OR gate 98 are the signals at the $Q_3$ output terminal of counter 84, and the 1-second signal from the D output terminal of divider 30.

The signal at output terminal C of divider 30 is a 1¼-Hz signal which is at its high level 0.4 of each second. When that signal, and the level at the $C_E$ terminal of counter 84 are both high, counter 84 is enabled and begins to count the 60 Hz counting pulses at its input $C_P$ terminal. When 16 such signals are counted the $Q_3$ terminal at counter 84 changes from a high to a low level, terminal $C_A$ at counter 84 changes from a high to a low level, and terminal $C_A$ at counter 44, which is trailing edge responsive, then goes from a high to a low state. This in turn causes output terminal A of counter 44, which was originally high, to become low, causing terminal ME at counter 84 to become low, thereby disabling counter 84. Thus, as desired, counter 84 is enabled during each 1-second sampling period only for a period required to sample and transfer the 16 bits of the clock word to data transmitter 86. The one signal at terminal D of divider 30 is also applied to an input of OR gate 98 and thus to input terminal $C_A$ of counter 44 to ensure that terminal A of the latter will be at a high level prior to the counting of 16 pulses at counter 84.

In the embodiment herein shown, the clock provides a 24-hour indication and all time indications must be reset upon the completion of a 24-hour period. To this end, a NAND gate 100 has one input connected to the output terminal Q of flip-flop 32, a second input connected to the C terminal of counter 50, and a third input receives the 3.2 KHz output signal of divider 22.

A second NAND gate 102 has one input connected to output terminal A of divider 28, and its other input connected to the 32-KHz signal output line of divider 22. Terminal A of divider 28 is also connected to the reset terminals of divider 30 and counter 50.

The outputs of NAND gates 100 and 102 are applied to the inputs of a NAND gate 104, the output of which is in turn connected to the $C_A$ input terminal of divider 28. The output of gate 102 is also connected to the reset terminal of flip-flop 32.

Gate 100 is thus enabled upon a reading of 24 hours and causes at that occurrence input terminal $C_A$ of divider 28 to go high, whereupon output terminal A of divider 28 also goes high. Counter 50 and divider 30 are thereupon reset to zero and gate 102 is enabled. The enabling of gate 102 in turn produces a reset signal for flip-flop 32. As a result, at midnight the appropriate counters and flip-flop 32 are re-set to zero to begin a new timing operation.

The clock data signals applied to the multiplexers 78–82 for transmission to the slave terminals 14 may also be used internally in master terminal 10 in which the clock circuit of FIG. 2 is located. To this end, the 16-bit parallel clock word is also applied to multiplexers 106 and 108. Coded multiplexer control signals are obtained from suitable control circuitry in the master terminal (not shown) at lines 110, which cause the clock signals to be serially transferred from multiplexers 106 and 108 to the appropriate data processing circuitry in the master terminal.

In the event that the time display produced at tubes 64–74 is erroneous as a result of, for example, a temporary power failure or the like, the clock indication may be corrected by the manual operation of switch 38, which as noted above, is usually in the "Normal" position. When switch 38 is in the "Fast" position line 112 is grounded. Gate 36 is disabled since one of its inputs is at ground, but NAND gate 116 is enabled, allowing the 64-Hz signal to be applied through gate 40 to the input of counter 42 to thereby rapidly up-date the succeeding counters and the clock indication. When switch 38 is placed in the "Slow" or up-date condition, line 118 is grounded, gate 36 is again disabled, and NAND gates 120 and 122 are both enabled, thereby allowing the 200-Hz signal from the output of divider 24 to be transferred through gate 40 to counter 42. This operation causes the updating of the counters and clock indication, but at a slower rate than in the fast up-date condition in which updating occurred at the 64-KHz rate.

When switch 38 is placed in the "Stop" position, line 124 is grounded, thereby enabling gate 36. Since gates 114–122 remain in the disabled condition no counting signals are applied to counters 42–50 so that the operation of the time source is terminated as desired.

The digital clock source described herein thus satisfies the objects set forth above in that it provides means for producing in a master computer terminal a time signal, and for periodically sampling and transferring that signal to an output device for subsequent transmission to one or more slave terminals at a rate significantly higher than the least significant time unit involved in the clock data signal transmission.

This frequent updating of the clock signals at the slave terminals ensures that the time displays at these terminals are in precise correspondence to the time signals produced at the master computer terminal. While a one-second sampling period has been herein specifically described, it will be obvious to those having ordinary skill in the art to vary that period if desired.

Thus, while only a single embodiment of the present invention has been herein specifically described, it will be apparent that modifications may be made therein without departing from the spirit and the scope of the invention.

I claim:

1. A master-slave clock system in which a master terminal transmits clock signals to at least one remote slave terminal coupled to said master terminal, said remote terminal including means for indicating the time in terms of a first least significant time unit periodically varying at a first rate, said system comprising means in said master terminal for developing timing signals in terms of a second least significant time unit varying at a second rate greater than said first rate, and means for periodically transmitting to said remote terminal a time signal correct to said first least significant unit at said second rate.

2. The system of claim 1, in which said first least significant time unit is a minute, and said second least significant time unit is a second, said circuit comprising means for enabling said transmitting means a predetermined period during each minute.

3. The system of claim 1, further comprising means for enabling said transmitting means a predetermined period during each of said first least significant time units.

4. The system of claim 3, in which said timing signal developing means comprises means for producing a multi-bit signal defining said time signal each of said first least significant time units, and said transmitting means comprises means for sequentially sending one bit of said multi-bit signal to said remote terminal each of said second least significant time units during said predetermined period.

5. The system of claim 4, in which said first least significant time unit is a minute, and said second least significant time unit is a second.

6. The system of claim 3, further comprising switch means having an input receiving said timing signals and an output coupled to said transmitting means, and control means for enabling said switch means only during said predetermined period.

7. The system of claim 6, in which said control means comprises counter means, and further comprising a source of counting signals, means for enabling counting of said counting signals at said counter means at a predetermined portion of each signal transferring period, and means for thereafter disabling counting after said counter means has counted a predetermined number of said counting signals, the period between said counting enabling and disabling defining said predetermined period.

8. A circuit for supplying clock signals to at least one remote terminal, said circuit comprising means for producing timing signals, switching means having an output, an input coupled to said timing signal producing means, and a control terminal, output means coupled to the output of said switching means and to said remote terminal, and control means coupled to said timing signal producing a series of means and to the control terminal of said switching means for periodically transferring timing signals from said switching means to said output means at a rate greater than that at which the least significant time unit of said transferred clock signal varies.

9. The circuit source of claim 8, further comprising means for periodically enabling said control means during a predetermined period of each timing signal transferring period.

10. The circuit of claim 9, in which said timing signals at the input of said switching means is in the form of a parallel multi-bit word, said control means comprising means for sequentially transferring succeeding ones of said bits to said output means at said greater rate during said predetermined period.

11. The circuit of claim 8, in which said control means comprises counter means, and further comprising a source of counting signals, means for initiating counting of said counting signals at said counter means at a predetermined portion of each signal transferring period, and means for thereafter disabling counting after said counter means has counted a predetermined number of said counting signals, the period between said counting enabling and disabling defining said predetermined period.

12. The system of claim 1, for use in a data processing system having a central data processing unit and at least one remote unit connected to said central data processing unit, in which said master terminal is positioned in and forms part of said central data processing unit, and wherein said remote slave terminal is positioned in and forms part of said one remote unit, said master-slave system including means for synchronizing said central data processing unit and said remote unit to continuously indicate the same time.

* * * * *

UNITED STATES PATENT OFFICE
CERTIFICATE OF CORRECTION

Patent No. 3,681,914 Dated August 8, 1972

Inventor(s) Harry R. Loewengart

It is certified that error appears in the above-identified patent and that said Letters Patent are hereby corrected as shown below:

IN THE CLAIMS:

Column 8, Claim 8, line 11, after "producing", --a series of-- should be inserted;
line 16, after "producing", --a series of-- should be deleted.

Signed and sealed this 9th day of January 1973.

(SEAL)
Attest:

EDWARD M.FLETCHER,JR.
Attesting Officer

ROBERT GOTTSCHALK
Commissioner of Patents